United States Patent
Lindoff et al.

(10) Patent No.: US 8,306,012 B2
(45) Date of Patent: Nov. 6, 2012

(54) CHANNEL ESTIMATION FOR SYNCHRONIZED CELLS IN A CELLULAR COMMUNICATION SYSTEM

(75) Inventors: Bengt Lindoff, Bjärred (SE); Fredrik Nordström, Lund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 634 days.

(21) Appl. No.: 12/203,649

(22) Filed: Sep. 3, 2008

(65) Prior Publication Data

US 2009/0116473 A1    May 7, 2009

Related U.S. Application Data

(60) Provisional application No. 60/986,146, filed on Nov. 7, 2007.

(51) Int. Cl.
H04J 3/06       (2006.01)
(52) U.S. Cl. .................................................. 370/350
(58) Field of Classification Search .................... None
See application file for complete search history.

(56) References Cited

U.S. PATENT DOCUMENTS

| | | | |
|---|---|---|---|
| 2005/0249319 A1 | 11/2005 | Suh et al. | |
| 2007/0049199 A1* | 3/2007 | Lim et al. ................. | 455/63.1 |
| 2007/0070945 A1* | 3/2007 | Wang et al. ............... | 370/329 |
| 2007/0147538 A1 | 6/2007 | Jung et al. | |
| 2007/0242782 A1 | 10/2007 | Han et al. | |
| 2007/0249350 A1 | 10/2007 | Jung et al. | |
| 2007/0298780 A1 | 12/2007 | Lindoff et al. | |
| 2009/0196164 A1* | 8/2009 | Vook et al. ............... | 370/208 |
| 2010/0020855 A1* | 1/2010 | Ito et al. .................. | 375/148 |

FOREIGN PATENT DOCUMENTS

| | | |
|---|---|---|
| EP | 1 473 956 A2 | 11/2004 |
| EP | 1 793 518 A1 | 6/2007 |
| WO | 2006/128354 A1 | 12/2006 |
| WO | 2007/115434 A1 | 10/2007 |

OTHER PUBLICATIONS

PCT International Search Report, dated May 6, 2009, in connection with International Application No. PCT/EP2008/064976.
PCT Written Opinion, dated May 6, 2009, in connection with International Application No. PCT/EP2008/064976.
Li, Geoffrey Ye: "Simplified Channel Estimation for OFDM Systems with Multiple Transmit Antennas" IEEE Transactions on Wireless Communications, IEEE Service Center, Piscataway, NJ, US, vol. 1, No. 1, Jan. 1, 2002, XP011064372, ISSN: 1536-1276.

* cited by examiner

*Primary Examiner* — Yemane Mesfin
*Assistant Examiner* — Leon Andrews
(74) *Attorney, Agent, or Firm* — Potomac Patent Group PLLC (57) ABSTRACT

Channel estimation is performed by user equipment operating in a mobile communications system. Estimation involves receiving a signal and analyzing it to detect a signal component from a neighboring cell. Depending on outcome, one or both of the following are determined: whether a power level of the signal component from the neighboring cell exceeds a power threshold level; and whether a difference between timing parameters of the neighboring cell's signal component and that from a serving cell is less than a timing threshold level. If the power level of the neighboring cell's signal component exceeds the power threshold level and the difference between the timing parameters of the signal components from the neighboring cell and that of the serving cell is less than the timing threshold level, then a joint channel estimation process is performed. Otherwise, a single channel estimation process is performed.

8 Claims, 8 Drawing Sheets

CHANNEL ESTIMATION FOR SYNCHRONIZED CELLS IN A CELLULAR COMMUNICATION SYSTEM

CROSS REFERENCE TO RELATED APPLICATIONS

This application claims the benefit of U.S. Provisional Application No. 60/986,146, filed Nov. 7, 2007, which is hereby incorporated herein by reference in its entirety.

BACKGROUND

The present invention relates to cellular telecommunications, and more particularly to methods and apparatuses that enable equipment in a cellular telecommunications system to perform channel estimation when the pilot signals of a serving cell and those of one or more neighboring cells collide due to the serving and neighboring cells being synchronized with one another.

The forthcoming Evolved-Universal Terrestrial Radio Access Network (E-UTRAN) Long Term Evolution (LTE) technology, as defined by 3GPP TR 36.201, "Evolved Universal Terrestrial Radio Access (E-UTRA); Long Term Evolution (LTE) physical layer; General description" will be able to operate over a very wide span of operating bandwidths (e.g., 1.4 MHz to 20 MHz) and also carrier frequencies. Furthermore E-UTRAN systems will be capable of operating within a large range of distances, from microcells (i.e., cells served by low power base stations that cover a limited area, such as a shopping center or other building accessible to the public) up to macrocells having a range that extends up to 100 km. In order to handle the different radio conditions that may occur in the different applications, multiple access in the downlink (i.e., the communications link from the base station to user equipment—"UE") is achieved by Orthogonal Frequency Division Multiple Access (OFDMA) technology because it is a radio access technology that can adapt very well to different propagation conditions. In OFDMA, the available data stream is portioned out into a number of narrowband subcarriers that are transmitted in parallel. Because each subcarrier is narrowband it only experiences flat-fading. This makes it very easy to demodulate each subcarrier at the receiver.

Data rates up to and even beyond 100 Mb/s will be supported for the largest bandwidth, and such data rates will be possible by using a Multiple-Input-Multiple Output (MIMO) scheme in the down-link.

Furthermore LTE technology operates in both synchronized and asynchronous networks. In a synchronized network, all of the base stations (e.g., eNodeBs) use the same timing over the air interface, whereas in an asynchronous network, a base station's air interface timing could differ from its neighbor's. The radio channel properties and characteristics of the received signals vary, depending on whether the network is synchronized or not. To take one example, in the case of synchronized networks, the estimated channel in the downlink is typically a multi-channel estimate of all contributing radio base stations. The channel estimate is degraded because the reference signals collide with one another. By contrast, in an asynchronous network the reference signals most-often collide with data rather than with other cells' reference signals, thereby giving a more random behavior that can be treated as noise.

In order to optimize throughput in the system when there is intercell interference, it is important for the UE to have a good channel estimate not only for its own serving cell, but also for any interfering radio channel. The current state of the art for channel estimation uses Wiener filtering in time and frequency. The noise in the model is typically modeled as colored noise. A conventional frequency-domain model for a received signal, Y, is:

$$Y_{k,l} = H_{k,l} u_{k,l} + E_{k,l},$$

where $H_{k,l}$ is the radio channel for symbol l on sub-carrier k between the serving cell and the UE and $E_{k,l}$ is additive noise.

A problem with the existing solution is that the presence of a strong interfering cell destroys the channel estimation, so that the channel estimation is made in a low signal-to-noise ratio (SNR) environment. It is therefore desirable to provide methods and apparatuses that provide improved performance over conventional techniques.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

Moreover, reference letters are provided in some instances (e.g., in the claims and summary) to facilitate identification of various steps and/or elements. However, the use of reference letters is not intended to impute or suggest that the so-referenced steps and/or elements are to be performed or operated in any particular order.

In accordance with one aspect of the present invention, the foregoing and other objects are achieved in methods and apparatuses for performing channel estimation at user equipment operating in a mobile communications system. Such channel estimation involves receiving a signal, and analyzing it to detect a signal component from a neighboring cell. Then, one or both of the following are determined (in any order):

whether a power level of the signal component from the neighboring cell exceeds a power threshold level; and whether a difference between a timing parameter of the signal component from the neighboring cell and a timing parameter of a signal component from a serving cell is less than a timing threshold level If it is true that both the power level of the signal component from the neighboring cell exceeds the power threshold level and the difference between the timing parameter of the signal component from the neighboring cell and the timing parameter of the signal component from the serving cell is less than the timing threshold level, then a joint channel estimation process is performed. Otherwise, a single channel estimation process is performed.

In an aspect of embodiments consistent with the invention, the joint channel estimation process satisfies $$Y_{k,l} = H_{k,l} u_{k,l} + \exp(j 2\pi \delta(\tau,k)) G_{k,l} v_{k,l} + E_{k,l},$$

wherein:

$Y_{k,l}$ is an l:th symbol on sub-carrier k of a received signal, Y;

$U_{k,l}$ is an l:th symbol transmitted on sub-carrier k by the serving cell;

$H_{k,l}$ is a channel for symbol l on sub-carrier k between the serving cell and the user equipment;

$V_{k,l}$ is an l:th symbol transmitted on sub-carrier k by the neighboring cell;

$G_{k,l}$ is a channel for symbol l on sub-carrier k between the neighboring cell and the user equipment;

$E_{k,l}$ is additive noise for symbol l on sub-carrier k;

τ the difference between the timing parameter of the signal component from the neighboring cell and the timing parameter of the signal component from the serving cell; and δ(·) is a function given by:

$$\delta(\tau, k) = \frac{-k\tau}{N}$$

wherein N is a size of a Discrete Fourier Transform process performed by the user equipment In another aspect, the single channel estimation process satisfies $$Y_{k,l} = H_{k,l} u_{k,l} + E_{k,l}.$$

In some embodiments, the received signal is generated by an orthogonal frequency division multiplexing process, and includes one or more symbols, each including a cyclic prefix. In at least some of such cases, the timing threshold level can correspond to the duration of the cyclic prefix.

BRIEF DESCRIPTION OF THE DRAWINGS

The objects and advantages of the invention will be understood by reading the following detailed description in conjunction with the drawings in which.

DETAILED DESCRIPTION

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments may be referred to herein as "logic configured to" perform a described action, or alternatively as "logic that" performs a described action.

In an aspect of some embodiments consistent with the invention, a cell search is performed to find one or more neighboring cells and their respective powers. The timing of the serving cell and of a neighboring cell is determined. A Discrete Fourier Transform (e.g., Fast Fourier Transform) is performed at the serving cell's timing. If the serving cell and a neighboring cell are time aligned within a number of samples, a joint channel estimation (including adjustment for some time misalignment) is performed. Otherwise, a conventional channel estimation is performed.

These and other aspects are described in detail in the following. To facilitate the discussion, LTE terminology is used in this description. However, the use of LTE terminology is not intended to imply that the various inventive concepts are applicable to only the LTE system. To the contrary, the various aspects of the invention can be embodied in any cellular communications system that is capable of operating in a synchronized mode.

Figure 1:
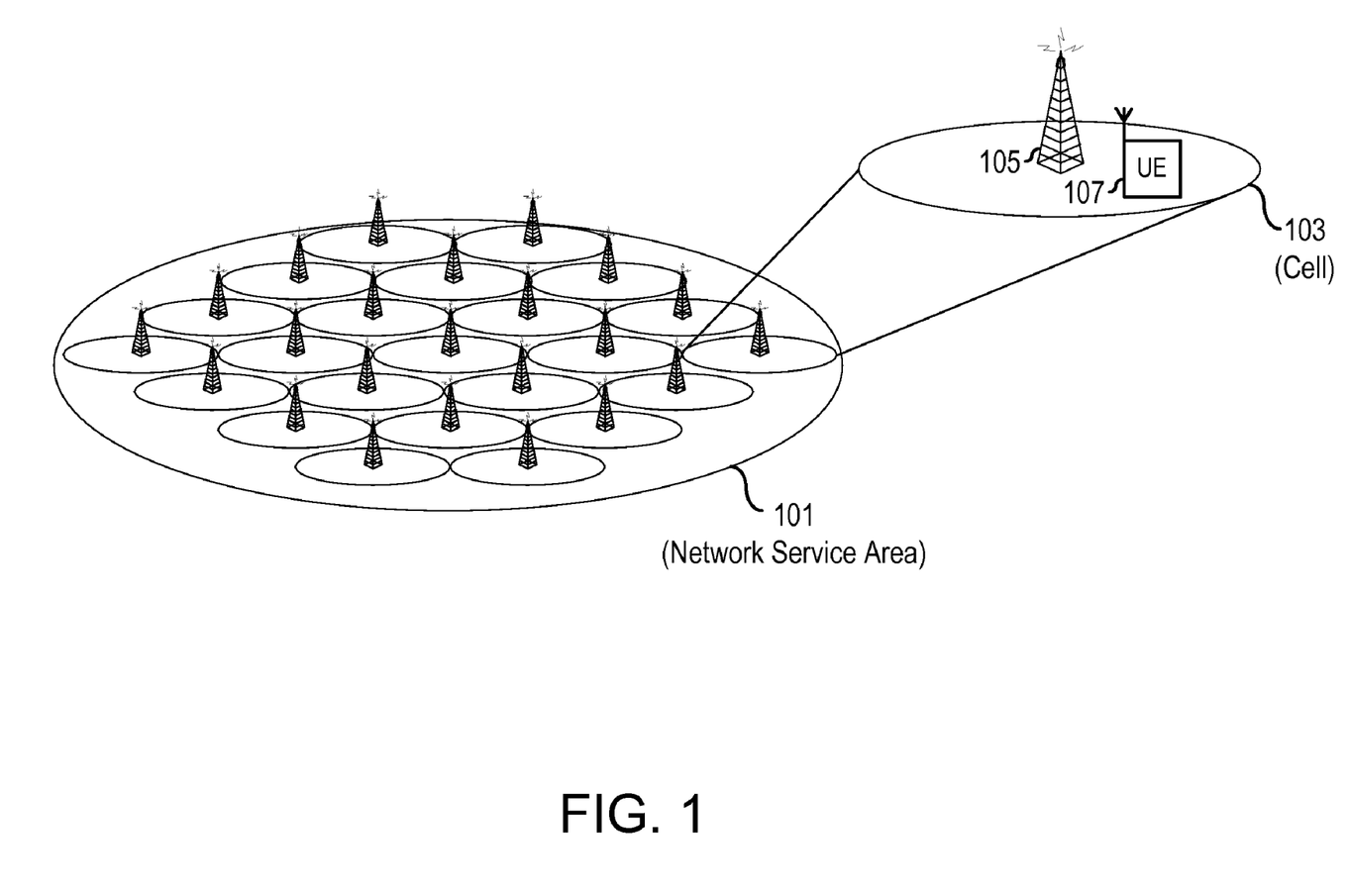
FIG. 1 illustrates a cellular communications system that covers a network service area that comprises a number of cells.

FIG. 1 illustrates a cellular communications system that covers a network service area 101. This service area comprises a number of cells, of which the cell 103 is but one example. The cell 103 is defined by its radio coverage, which is provided by a radio base station 105 (e.g., eNodeB). One or more UEs, such as the UE 107, that are within range of the radio base station 105 are served by that base station 105.

Figure 2:
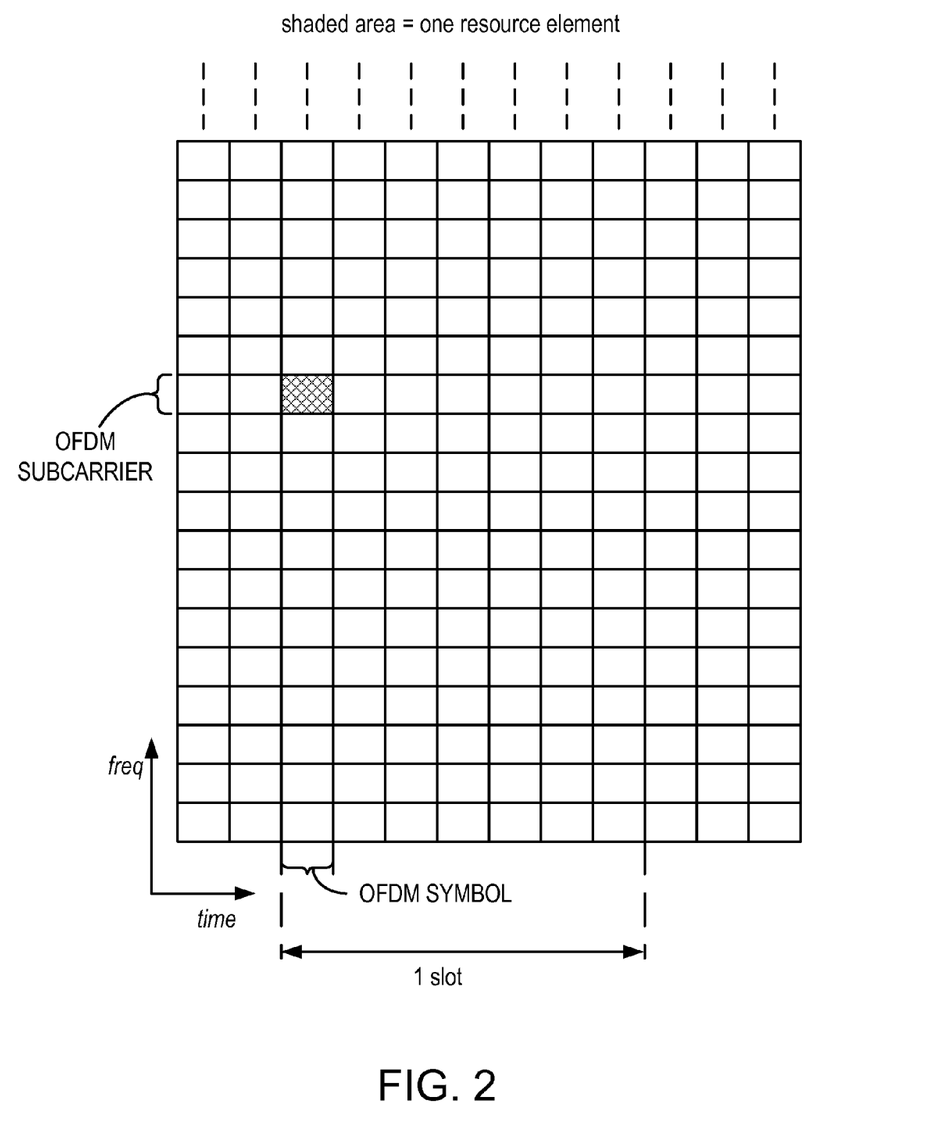
FIG. 2 illustrates a time-frequency grid an exemplary LTE downlink physical resource ("resource element") that corresponds to one OFDM subcarrier during one OFDM symbol interval.

The LTE physical layer downlink transmission is based on OFDM. The basic LTE downlink physical resource can thus be seen as a time-frequency grid as illustrated in FIG. 2, in which each so-called "resource element" corresponds to one OFDM subcarrier during one OFDM symbol interval.

Figure 3:
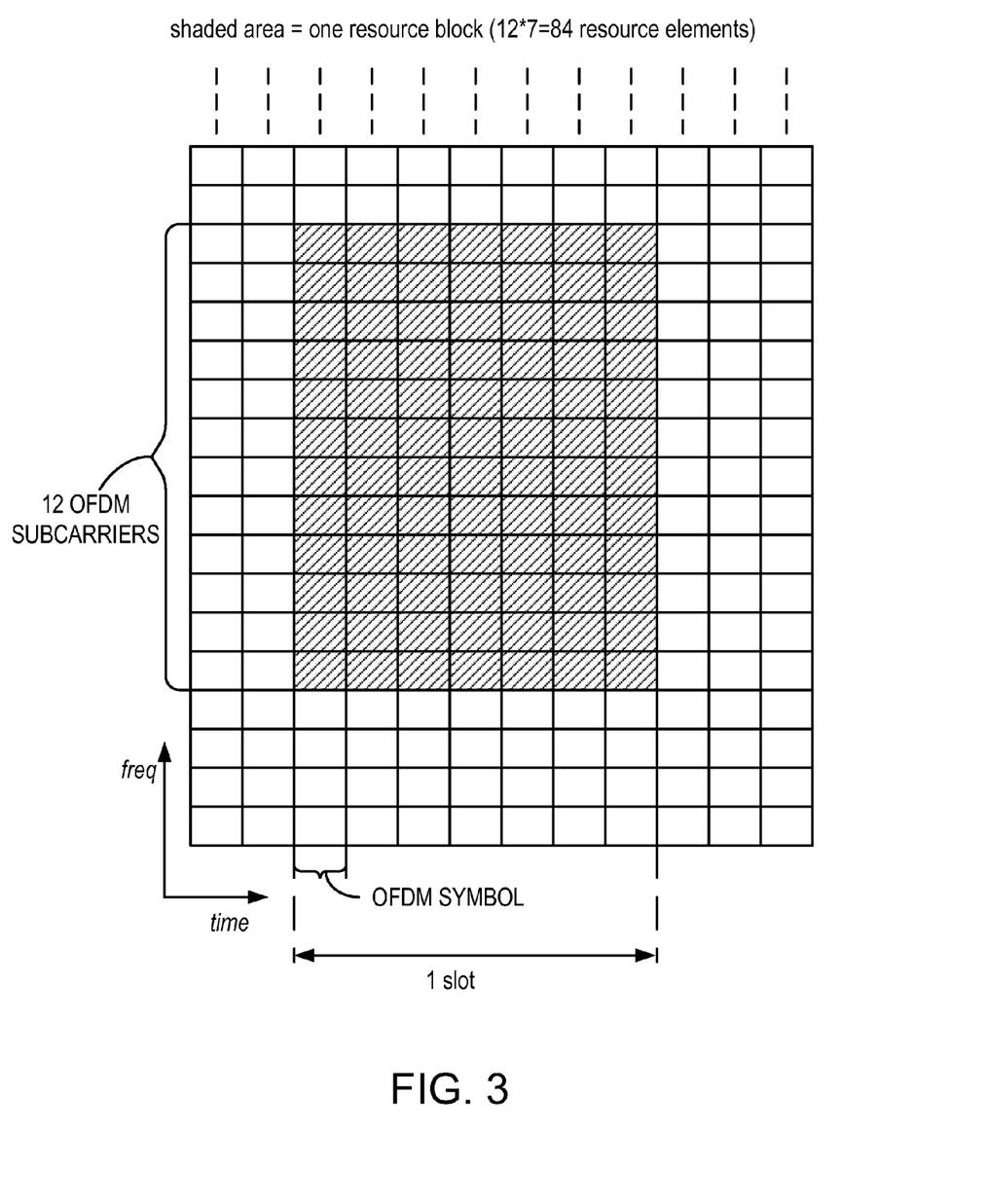
FIG. 3 is a time-frequency grid illustrating how downlink subcarriers in the frequency domain are grouped into resource blocks.

As illustrated in FIG. 3, the downlink subcarriers in the frequency domain are grouped into resource blocks, where each resource block consists of twelve subcarriers for a duration of one 0.5 ms slot (7 OFDM symbols when normal cyclic prefixes are used (as illustrated) or 6 OFDM symbols when extended cyclic prefixes are used), corresponding to a nominal resource-block bandwidth of 180 kHz.

The total number of downlink subcarriers, including a DC-subcarrier, thus equals $N_c = 12 \cdot N_{RB} + 1$ where $N_{RB}$ is the maximum number of resource blocks that can be formed from the $12 \cdot N_{RB}$ usable subcarriers. The LTE physical-layer specification actually allows for a downlink carrier to consist of any number of resource blocks, ranging from $N_{RB-min} = 6$ and upwards, corresponding to a nominal transmission bandwidth ranging from 1.4 MHz up to 20 MHz. This allows for a very high degree of LTE bandwidth/spectrum flexibility, at least from a physical-layer-specification point-of-view.

Figure 4A:
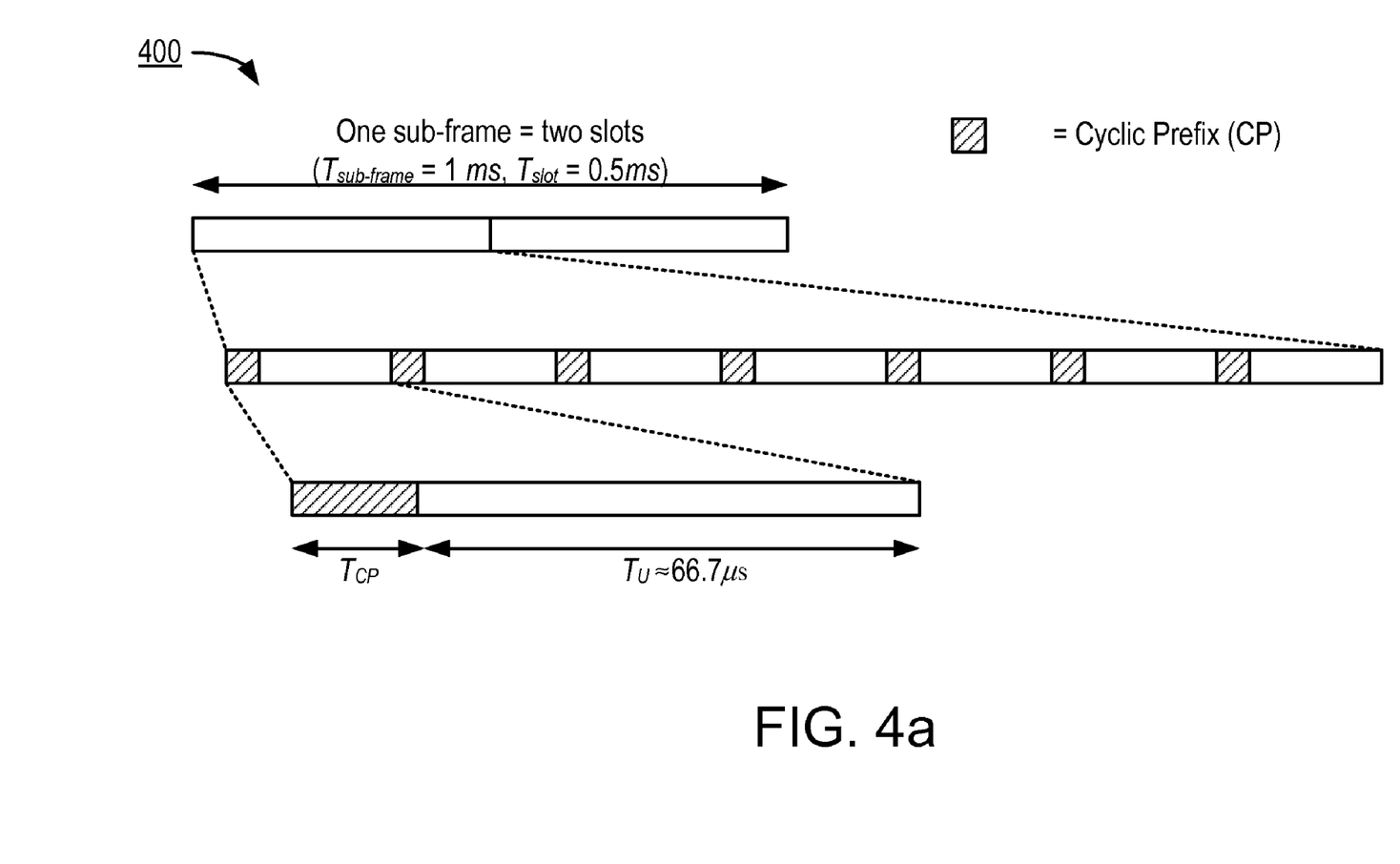
FIG. 4a illustrates a so-called "normal" cyclic prefix length, which allows seven OFDM symbols per slot to be communicated.
Figure 4B:
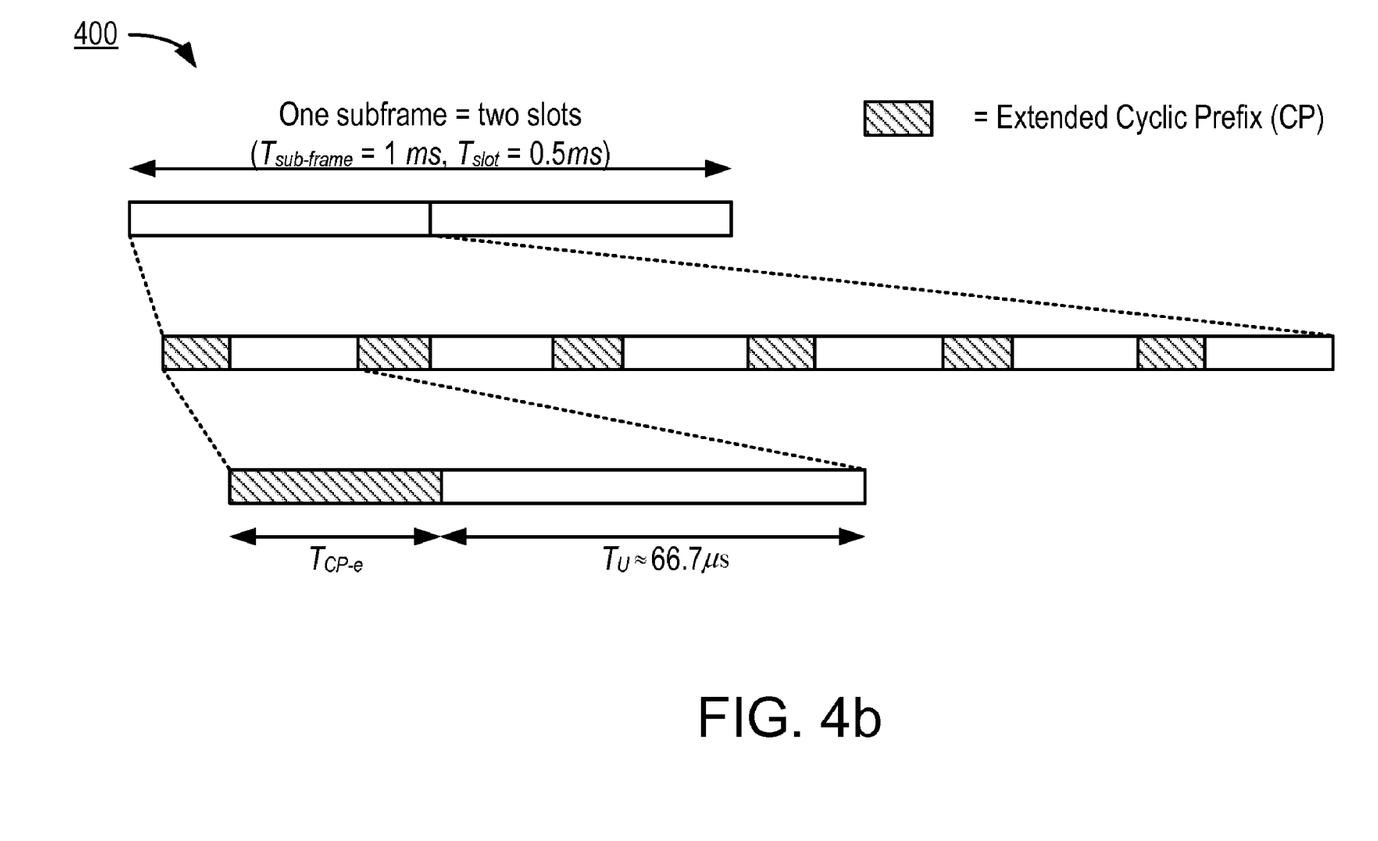
FIG. 4b illustrates an extended cyclic prefix, which because of its longer size, allows only six OFDM symbols per slot to be communicated.

FIGS. 4a and 4b illustrate the time-domain structure for LTE downlink transmission. Each 1 ms subframe 400 consists of two slots of length $T_{slot} = 0.5$ ms ($= 15360 \cdot T_S$, wherein each slot comprises 15,360 time units, $T_S$). Each slot then consists of a number of OFDM symbols.

A subcarrier spacing $\Delta f = 15$ kHz corresponds to a useful symbol time $T_u = 1/\Delta f \approx 66.7$ μs($2048 \cdot T_S$). The overall OFDM symbol time is then the sum of the useful symbol time and the cyclic prefix length $T_{CP}$. Two cyclic prefix lengths are defined. FIG. 4a illustrates a normal cyclic prefix length, which allows seven OFDM symbols per slot to be communicated. The length of a normal cyclic prefix, $T_{CP}$, is $160 \cdot T_S \approx 5.1$ μs for the first OFDM symbol of the slot, and $144 \cdot T_S \approx 4.7$ μs for the remaining OFDM symbols.

FIG. 4b illustrates an extended cyclic prefix, which because of its longer size, allows only six OFDM symbols per slot to be communicated. The length of an extended cyclic prefix, $T_{CP-e}$, is $512 \cdot T_S \approx 16.7$ μs.

It will be observed that, in the case of the normal cyclic prefix, the cyclic prefix length for the first OFDM symbol of a slot is somewhat larger than those for the remaining OFDM symbols. The reason for this is simply to fill out the entire 0.5 ms slot, as the number of time units per slot, $T_S$, (15360) is not evenly divisible by seven.

When the downlink time-domain structure of a resource block is taken into account (i.e., the use of 12 subcarriers during a 0.5 ms slot), it will be seen that each resource block consists of $12 \cdot 7 = 84$ resource elements for the case of normal cyclic prefix (illustrated in FIG. 3), and $12 \cdot 6 = 72$ resource elements for the case of the extended cyclic prefix (not shown).

Figure 5:
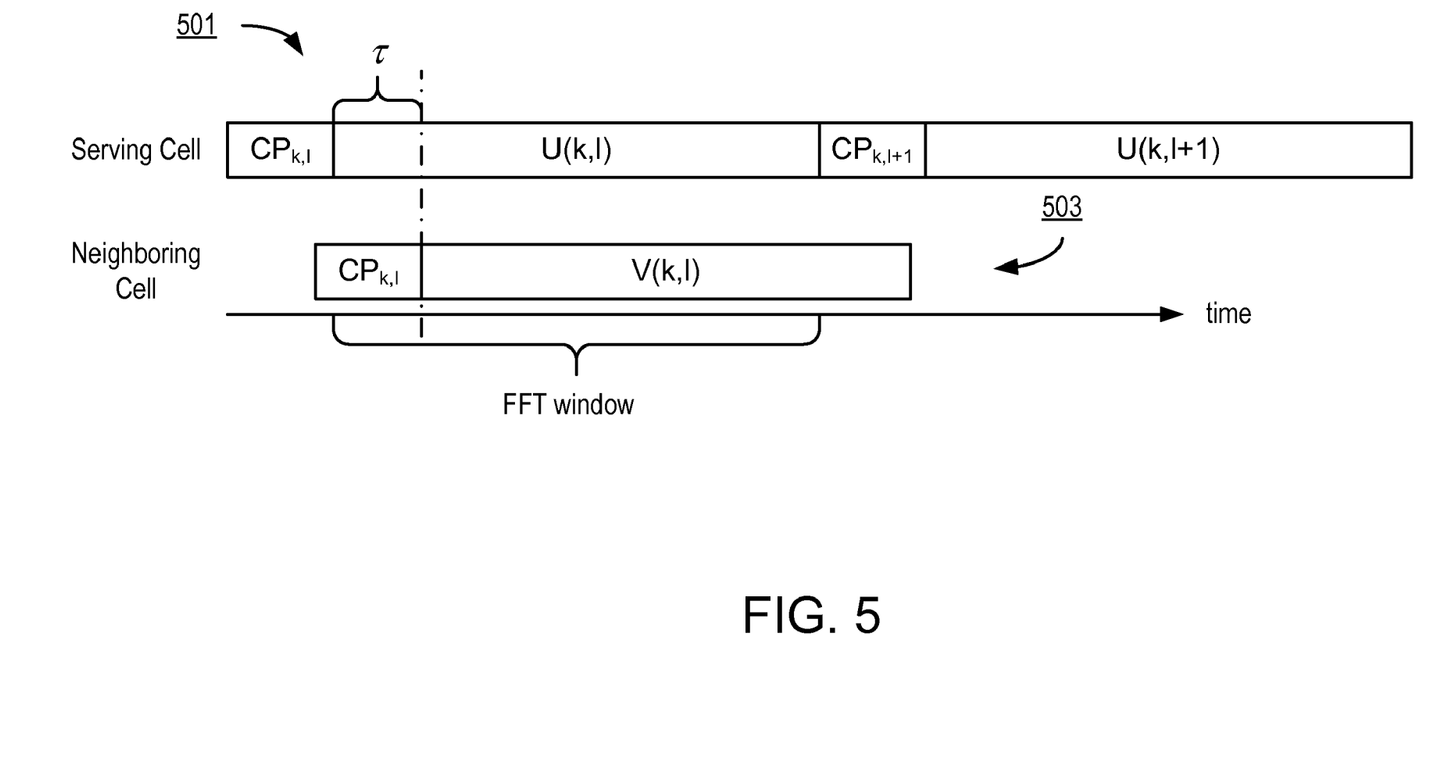
FIG. 5 is a signal timing diagram that illustrates how an air interface can appear to a UE in a synchronized network.

FIG. 5 is a signal timing diagram that illustrates how an air interface can appear to a UE in a synchronized network. The UE receives a serving cell's radio signal 501. In this example, the UE additionally receives a neighboring cell's radio signal 503. Because the network is synchronized, the timing of the signals from the serving cell and the neighboring cell will be coordinated with one another, and will therefore have similar timings. The UE can determine the timing relationship by comparing the time of occurrence of periodically occurring signals within each of the radio frames. For example, in an LTE system, the synchronization signals, P-SyS or S-SyS ("P/S-SyS") can be used for this purpose. In this example, the occurrence of the neighboring cell's synchronized radio signal 503 is delayed, relative to that of the serving cell's radio signal 501, by a relatively small amount (e.g., no more than the duration of the cyclic prefix), herein denoted τ. The reason for any delay at all is due to the larger distance (and hence larger propagation delay) between the UE and the neighboring cell than exists between the UE and its serving cell.

In an aspect of embodiments consistent with the invention, the influence of interfering cells on channel estimation is reduced when the serving and interfering cells are at least approximately time aligned (i.e., when the timing between cells is such that reference symbols (pilots) collide). In such cases, a joint estimation of both radio channels is performed. A model for the received signal in the frequency domain at sub-carrier k and symbol l is:

$$Y_{k,l} = H_{k,l} u_{k,l} + G_{k,l} v_{k,l} + E_{k,l},$$

where H is the channel response between the serving cell and the UE, G is the channel response between the interfering (neighboring) cell and the UE, u and v are the sent transmitted data/pilots for the serving cell and interfering cells, respectively, and E is additive noise. Those skilled in the art will recognize from this example how to extend the model to include several interfering base stations.

The UE regularly searches for neighboring cells and keeps track of the neighboring base station identity and the relative time difference between the neighboring cell and the serving cell. If the serving cell and interfering cells are time aligned and belong to the same cell group ID, the pilots overlap. Therefore, both u and v are known at the reference symbol position. It is therefore possible to estimate $H_{k,l}$ and $G_{k,l}$ jointly by using two or more $Y_{k,l}$s; that is, using the elements in the vector $Y_{K,L} = \{Y_{k_1 l_1}, Y_{k_2 l_2}, \ldots\}$, where K and L are subsets of the possible ks and ls containing reference symbols. The different $Y_{k,l}$s in $Y_{K,L}$ can be weighted differently, for example, depending inversely on distance to the sub-carrier and symbol at which the channel estimate is calculated. The joint channel estimation algorithm can be performed in any of a number of ways, such as by means of least squares estimation, weighted least squares estimation or maximum likelihood estimation.

In an aspect of embodiments consistent with the invention, if the cells are not exactly time aligned the model becomes $$Y_{k,l} = H_{k,l} u_{k,l} + \exp(j2\pi\delta(\tau,k)) G_{k,l} v_{k,l} + E_{k,l},$$

where τ is a difference between a timing parameter (e.g., synchronization point) of a signal component from the neighboring cell and a timing parameter (e.g., synchronization point) of a signal component from a serving cell of the UE, and the function $\delta(\cdot)$ is given by:

$$\delta(\tau, k) = \frac{-k\tau}{N}$$

where N is the size of the UE's Discrete Fourier Transform (e.g., Fast Fourier Transform—"FFT"). The maximum value of |τ| is on the order of half an OFDM symbol, which means, in a 20 MHz LTE system, $|\tau| \leq 1024$ samples.

Furthermore, if an OFDM symbol that contains reference symbols is time aligned or nearly time aligned with an interfering cell's OFDM symbol, with the reference symbol being on the same sub-carriers, the above joint channel estimation method can also be applied. This means that the cells are aligned to $\approx n0.5$ ms in an LTE system, where $n = \{\ldots, -2, -1, 0, 1, 2 \ldots\}$.

Figure 6:
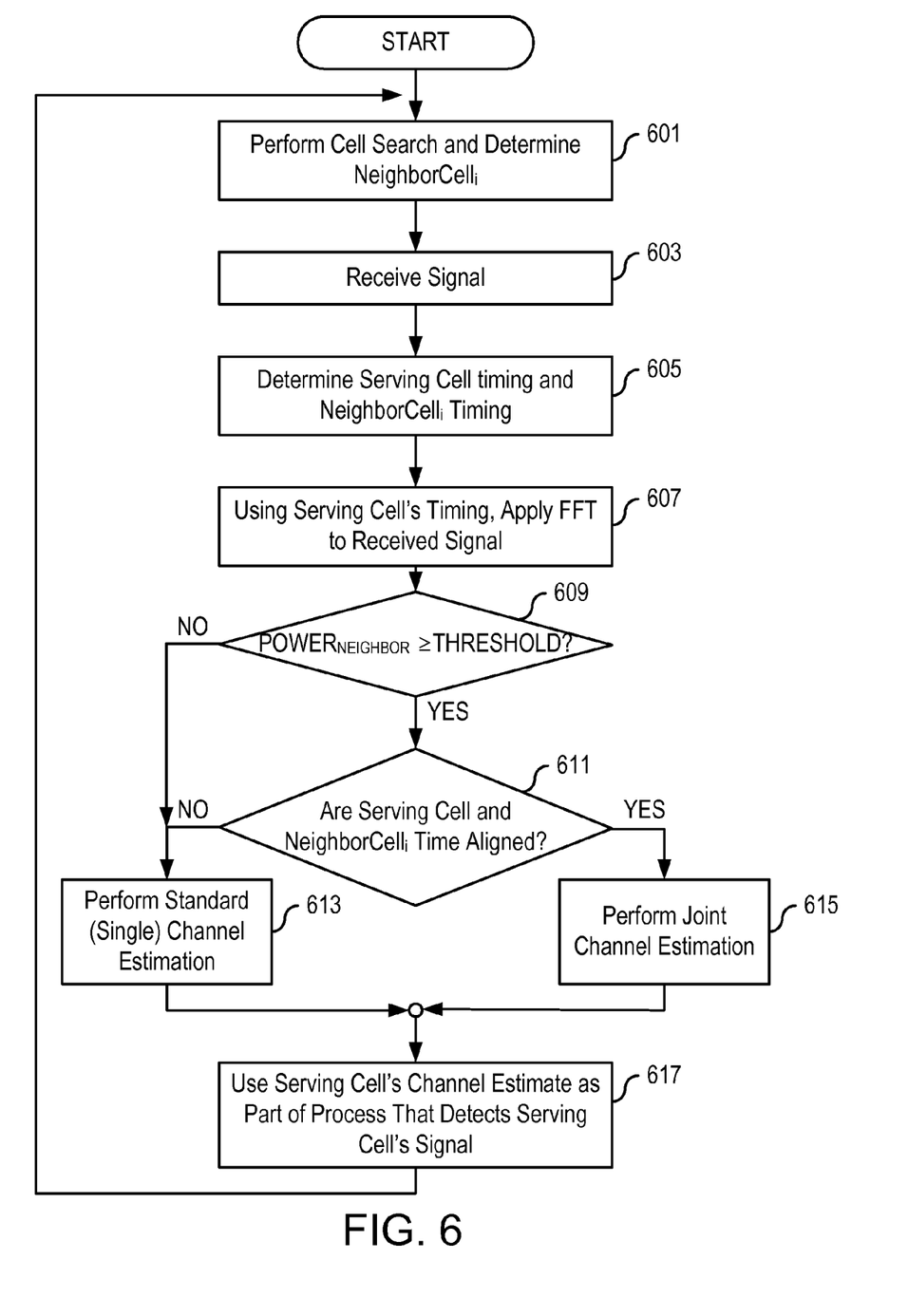
FIG. 6 is a flowchart of exemplary steps/processes carried out by suitably adapted logic in a UE in accordance with exemplary embodiments of the invention.

FIG. 6 is a flowchart of exemplary steps/processes carried out by suitably adapted logic in a UE in accordance with exemplary embodiments of the invention. The UE, as part of its standard operation, performs a cell search and determines the presence of a neighboring cell (NeighborCell$_i$) (step 601). The UE receives a signal (step 603), from which it is able to determine the timing of its own serving cell, as well as the timing of the neighboring cell (NeighborCell$_i$) (Step 605). The received signal is then processed by a Discrete Fourier Transform (e.g., a Fast Fourier Transform—"FFT") with FFT window placement being based on the serving cell's timing (step 607).

The frequency domain signal generated by the FFT is the source of information from which the channel will be estimated. However, the type of channel estimation to be performed depends on whether the power of the neighboring cell's signal is strong enough (i.e., greater than or equal to a predetermined power threshold value) to warrant joint channel estimation (decision block 609) and whether the respective timings of the serving cell and of the neighboring cell (NeighborCell$_i$) are close enough to one another to be considered time aligned (decision block 611). Determining whether the respective timings of the serving and neighboring cells are close enough to one another can be performed by determining a difference between a timing parameter (e.g., synchronization point) of a signal component from the neighboring cell and a timing parameter (e.g., synchronization point) of a signal component from a serving cell, and ascertaining whether this difference is less than (or equal to) a predetermined timing threshold level.

Accordingly, if the answer to either of these questions posed by decision blocks 609 and 611 is "no" ("NO" path out of decision block 609 or "NO" path out of decision block 611), a standard (i.e., single) channel estimation is performed whose output is the channel estimate of only the serving cell (step 613). If the power of the neighboring cell's signal is sufficiently strong ("YES" path out of decision block 609) and the serving and neighboring cells are considered to be time aligned ("YES" path out of decision block 611), then a joint channel estimation is performed, using techniques described above (step 615). The output of the joint channel estimation is a channel estimate of not only the serving cell, but also of the one or more detected neighboring cells that are time aligned with the serving cell.

A reason why it is useful to include the neighboring cell's signal power level as one of the factors for determining whether or not to perform joint channel estimation is because having the neighboring cell's signal power level be too low introduces too much noise into the model; the transfer function between the neighboring cell and the UE involves too many parameters to estimate.

Regardless of the type of channel estimation that was performed, a channel estimate of the serving cell is produced and this, along with a frequency domain representation of the received signal, are supplied to a process/circuitry that detects the serving cell's signal (step 617).

In the exemplary embodiment illustrated by FIG. 6, the ascertaining whether the power of the neighboring cell's signal is strong enough to warrant joint channel estimation is depicted as occurring prior to ascertaining whether the respective timings of the serving cell and of the neighboring cell are close enough to one another to be considered time aligned. It will be appreciated, however, that in alternative embodiments, these tests can be performed in the opposite order. It will further be appreciated that various alternative embodiments can be designed in which, having first ascertained that that the power of the neighboring cell's signal is not strong enough to warrant the use of joint channel estimation, the user equipment does not even determine the difference between the respective timings of the serving cell and of the neighboring cell. Or in other alternatives, having first determined that the respective timings of the serving cell and of the neighboring cell are not close enough to one another to warrant the use of joint channel estimation, the user equipment does not even ascertain whether the power of the neighboring cell's signal is strong enough to warrant joint channel estimation. And in yet other alternatives, both of these tests can be performed regardless of the various outcomes. A common element in all of these alternatives is that if any one test indicates that joint channel estimation should be performed, then the other test will also be performed, since both tests must be satisfied before joint channel estimation will be performed.

Figure 7:
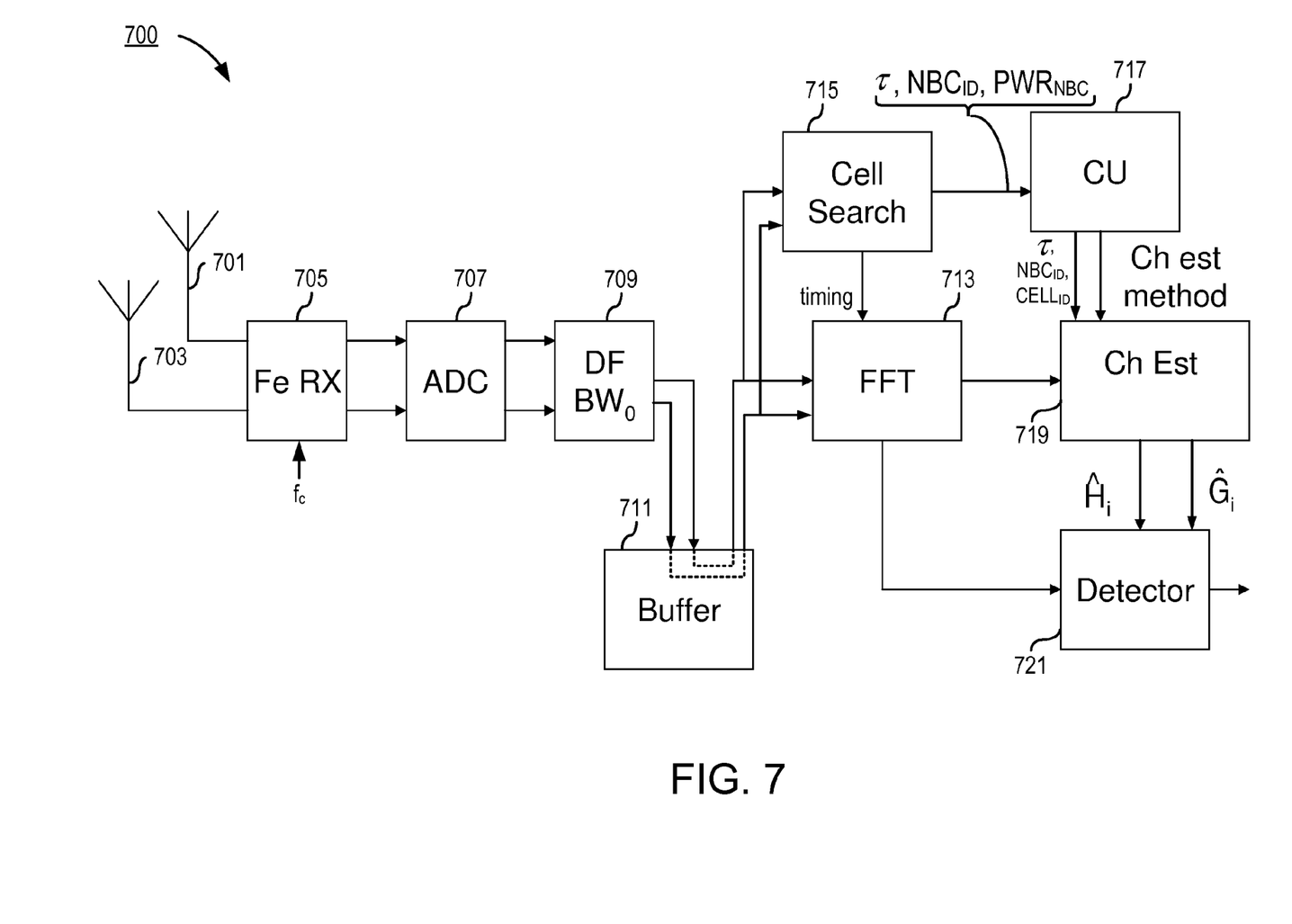
FIG. 7 is a block diagram of an exemplary UE adapted to carry out various aspects of the invention.

A block diagram of a UE 700 adapted to carry out various aspects of the invention is shown in FIG. 7. It will be appreciated that the functional blocks depicted in FIG. 7 can be combined and re-arranged in a variety of equivalent ways, and that the many of the functions can be performed by one or more suitably programmed digital signal processors. It will further be appreciated that some functional blocks that are part of the UE 700 (e.g., those functional blocks associated with transmission) have been omitted from the figure for the sake of clarity.

As depicted in FIG. 7, a UE 700 has a first antenna 701 and a second antenna 703 that supply a received radio signal to a front end receiver (Fe RX) 705. The presence of two antennas is useful for Multiple-Input Multiple-Output (MIMO) radio operation. However, the presence of two antennas is by no means essential to the invention, and alternative embodiments can be constructed having just one antenna or more than two antennas.

The front end receiver 705 typically down-converts the received radio signal into an analog baseband signal. For this purpose, the front end receiver 705 is supplied with a locally-generated carrier frequency, $f_c$. The baseband signal can be shaped by a filter having a bandwidth $BW_0$ (not shown) and gain corrected by automatic gain control (AGC) circuitry (not shown). The gain corrected signal is then converted from analog to digital form by an analog-to-digital converter (ADC) 707.

The digitized baseband signal is further spectrally shaped by a digital filter 709 that has the bandwidth $BW_0$, and the filtered digital baseband signal is provided to a buffer 711 that stores the filtered digital baseband signal (at least temporarily) for further processing. The storage of the filtered digital baseband signal in the buffer 711 eases requirements on processing speed during subsequent processing. That further processing includes supplying the filtered digital baseband signal to a processor 713 that implements a Fast Fourier Transform (FFT) or other suitable algorithm that generates a frequency-domain (spectral) representation of the baseband signal.

The filtered digital baseband signal is also provided to a cell search unit 715 that carries out one or more methods for searching for cells as specified for the particular communication system (e.g., 3G LTE). Typically, such methods involve detecting predetermined primary and/or secondary synchronization channel (P/S-SCH) signals that are present in the received signal.

The cell search unit 715 provides suitable timing signals to the processor 713 for establishing the start of the FFT window.

The cell search unit 715 also generates information identifying one or more detected neighboring cells as well as the neighboring cell(s)' signal power and timing difference, $\tau$, between the serving cell's timing and that of the detected neighboring cell(s), and provides this information to a control unit (CU) 717. The control unit 717 determines whether the timing difference, $\tau$, is small enough for the serving cell and the neighboring cell to be considered synchronized. This may be accomplished by, for example, comparing the timing difference, $\tau$, with a predefined threshold value. As an example, a threshold level can be set equal to the length of a cyclic prefix.

The control unit 717 also determines whether the power level of the neighboring cell(s)' signal is high enough to warrant the use of joint channel estimation.

The control unit 717 provides a control signal to a channel estimation unit 719 indicating the type of channel estimation to be employed: single estimation if the serving and neighboring cells are unsynchronized or the neighboring cell's power level is too low, and joint estimation if the serving and neighboring cells are synchronized and the neighboring cell's power level is sufficiently high.

The channel estimation unit 719 performs the indicated channel estimation (single or joint) utilizing the frequency domain signal provided by the FFT processor 713.

The channel estimation unit 719 provides channel estimates $\hat{H}_i$ to a symbol detector 721. If joint channel estimation was performed, then the channel estimates $\hat{G}_i$ are also supplied, since these can be useful for symbol detection. The detected symbols are then made available for further processing in the UE (not shown).

The various embodiments of the invention are effective at reducing the influence of interfering cells when performing channel estimation. It is additionally useful for providing estimates of the radio channel between an interfering neighboring cell's base station and the UE. Such information can be useful, for example, as part of a demodulation process.

The invention has been described with reference to particular embodiments. However, it will be readily apparent to those skilled in the art that it is possible to embody the invention in specific forms other than those of the embodiment described above. The described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of performing channel estimation at user equipment operating in a mobile communications system, the method comprising:
   receiving a signal;
   analyzing the signal to detect a signal component from a neighboring cell;
   determining, in any order, one or both of the following:
      whether a power level of the signal component from the neighboring cell exceeds a power threshold level; and
      whether a difference between a timing parameter of the signal component from the neighboring cell and a timing parameter of a signal component from a serving cell is less than a timing threshold level;
   if it is true that both the power level of the signal component from the neighboring cell exceeds the power threshold level and the difference between the timing parameter of the signal component from the neighboring cell and the timing parameter of the signal component from the serving cell is less than the timing threshold level, then performing a joint channel estimation process, and otherwise performing a single channel estimation process,
   wherein:
   the received signal is generated by an orthogonal frequency division multiplexing process, and includes one or more symbols, each including a cyclic prefix; and
   the joint channel estimation process is at least in part a function of the difference between the timing parameter of the signal component from the neighboring cell and the timing parameter of the signal component from the serving cell.

2. The method of claim 1, wherein the joint channel estimation process satisfies $$Y_{k,l} = H_{k,l} u_{k,l} + \exp(j2\pi\delta(\tau,k)) G_{k,l} v_{k,l} + E_{k,l},$$

wherein:
   $Y_{k,l}$ is an l:th symbol on sub-carrier k of a received signal, Y;
   $u_{k,l}$ is an l:th symbol transmitted on sub-carrier k by the serving cell;
   $H_{k,l}$ is a channel for symbol l on sub-carrier k between the serving cell and the user equipment;
   $v_{k,l}$ is an l:th symbol transmitted on sub-carrier k by the neighboring cell;
   $G_{k,l}$ is a channel for symbol l on sub-carrier k between the neighboring cell and the user equipment;
   $E_{k,l}$ is additive noise for symbol l on sub-carrier k;
   $\tau$ the difference between the timing parameter of the signal component from the neighboring cell and the timing parameter of the signal component from the serving cell; and
   $\delta(\cdot)$ is a function given by:

$$\delta(\tau, k) = \frac{-k\tau}{N}$$

wherein N is a size of a Discrete Fourier Transform process performed by the user equipment;
and wherein further:
the single channel estimation process satisfies $$Y_{k,l} = H_{k,l} u_{k,l} + E_{k,l}.$$

3. The method of claim 1, wherein the timing threshold level corresponds to the duration of the cyclic prefix.

4. An apparatus for performing channel estimation at user equipment operating in a mobile communications system, the apparatus comprising:
   logic circuitry adapted to receive a signal;
   logic circuitry adapted to analyze the signal to detect a signal component from a neighboring cell;
   logic circuitry adapted to determine, in any order, one or both of the following:
      whether a power level of the signal component from the neighboring cell exceeds a power threshold level; and
      whether a difference between a timing parameter of the signal component from the neighboring cell and a timing parameter of a signal component from a serving cell is less than a timing threshold level;
   logic circuitry adapted to perform a joint channel estimation process only if it is true that both the power level of the signal component from the neighboring cell exceeds the power threshold level and the difference between the timing parameter of the signal component from the neighboring cell and the timing parameter of the signal component from the serving cell is less than the timing threshold, and otherwise to perform a single channel estimation process,
   wherein:
   the received signal is generated by an orthogonal frequency division multiplexing process, and includes one or more symbols, each including a cyclic prefix; and
   the joint channel estimation process is at least in part a function of the difference between the timing parameter of the signal component from the neighboring cell and the timing parameter of the signal component from the serving cell.

5. The apparatus of claim 4, wherein the joint channel estimation process satisfies $$Y_{k,l} = H_{k,l} u_{k,l} + \exp(j2\pi\delta(\tau,k)) G_{k,l} v_{k,l} + E_{k,l},$$

wherein:
   $Y_{k,l}$ is an l:th symbol on sub-carrier k of a received signal, Y;
   $u_{k,l}$ is an l:th symbol transmitted on sub-carrier k by the serving cell;
   $H_{k,l}$ is a channel for symbol l on sub-carrier k between the serving cell and the user equipment;
   $v_{k,l}$ is an l:th symbol transmitted on sub-carrier k by the neighboring cell;
   $G_{k,l}$ is a channel for symbol l on sub-carrier k between the neighboring cell and the user equipment;
   $E_{k,l}$ is additive noise for symbol l on sub-carrier k;
   $\tau$ the difference between the timing parameter of the signal component from the neighboring cell and the timing parameter of the signal component from the serving cell; and
   $\delta(\cdot)$ is a function given by:

$$\delta(\tau, k) = \frac{-k\tau}{N}$$

wherein N is a size of a Discrete Fourier Transform process performed by the user equipment;
and wherein further:
the single channel estimation process satisfies $$Y_{k,l} = H_{k,l} u_{k,l} + E_{k,l}.$$

6. The apparatus of claim 4, wherein the timing threshold level corresponds to the duration of the cyclic prefix.

7. The method of claim 1, wherein the joint channel estimation process satisfies a formula in which a received symbol is equal to a sum of a first term, a second term, and a third term, wherein the first term is a channel between the server cell and the user equipment times a symbol transmitted by the serving cell, the second term is a channel between the neighboring cell and the user equipment times a symbol transmitted by the neighboring cell times a rotation that is a function of the difference between the timing parameter of the signal component from the neighboring cell and the timing parameter of the signal component from the serving cell, and the third term is additive noise.

8. The apparatus of claim 4, wherein the joint channel estimation process satisfies a formula in which a received symbol is equal to a sum of a first term, a second term, and a third term, wherein the first term is a channel between the server cell and the user equipment times a symbol transmitted by the serving cell, the second term is a channel between the neighboring cell and the user equipment times a symbol transmitted by the neighboring cell times a rotation that is a function of the difference between the timing parameter of the signal component from the neighboring cell and the timing parameter of the signal component from the serving cell, and the third term is additive noise.

* * * * *

UNITED STATES PATENT AND TRADEMARK OFFICE
CERTIFICATE OF CORRECTION

PATENT NO.         : 8,306,012 B2
APPLICATION NO.    : 12/203649
DATED              : November 6, 2012
INVENTOR(S)        : Lindoff et al.

It is certified that error appears in the above-identified patent and that said Letters Patent is hereby corrected as shown below:

In Column 2, Line 59, delete "$U_{k,l}$" and insert -- $u_{k,l}$ --, therefor.

In Column 2, Line 63, delete "$V_{k,l}$" and insert -- $v_{k,l}$ --, therefor.

In Column 6, Lines 32-33, delete "n={...,-2,-1,0,1,2...}." and insert -- n={...,-2,-1,0,1,2,...}. --, therefor.

In Column 9, Line 50, in Claim 2, delete "$Y_{k,l} = H_{k,l} u_{k,l} + \exp(j2\pi\delta(\tau,k)) G_{k,l} v_{k,l} + E_{k,l},$" and insert -- $Y_{k,l} = H_{k,l} u_{k,l} + \exp(j2\pi\delta(\tau,k)) G_{k,l} v_{k,l} + E_{k,l},$ --, therefor.

Signed and Sealed this
Fifth Day of February, 2013

Teresa Stanek Rea
*Acting Director of the United States Patent and Trademark Office*